United States Patent [19]
Denuto et al.

[11] Patent Number: 6,071,001
[45] Date of Patent: Jun. 6, 2000

[54] FIBER OPTIC LIGHT SOURCE MODULE WITH RESILIENT GROMMET SUPPORTING MEANS FOR A LIGHT-TRANSMISSIVE ROD WITH SQUARE CROSS-SECTION

[75] Inventors: John V. Denuto, Warren; Alan B. Toot, Niles; Matthew S. Mrakovich, Canfield, all of Ohio

[73] Assignee: General Motors Corporation, Detroit, Mich.

[21] Appl. No.: 09/190,333

[22] Filed: Nov. 12, 1998

[51] Int. Cl.[7] .................................................. F21V 7/04
[52] U.S. Cl. ...................... 362/581; 362/551; 362/288; 385/901; 385/133
[58] Field of Search .................................. 362/551, 581, 362/288; 385/901, 133

[56] References Cited

U.S. PATENT DOCUMENTS

| | | | |
|---|---|---|---|
| 2,080,259 | 5/1937 | Frei, Jr. ................................... | 362/569 |
| 2,765,458 | 10/1956 | Hoover ....................................... | 355/1 |

*Primary Examiner*—Sandra O'Shea
*Assistant Examiner*—Ronald E. DelGizzi
*Attorney, Agent, or Firm*—Patrick M Griffin

[57] ABSTRACT

A fiber optic light source module (FOLSM) of a hybrid fiber optic lighting distribution system for distributing light from the FOLSM to various lighting features. The FOLSM includes a base, a lamp holder connected to a forward portion of the base and an access cover connected to a rearward portion of the base independent of the lamp holder. The base has a lamp cavity, a communicating lower rod support and an electrical lead port. The lamp holder has a front cover for covering the lamp cavity, an upper rod support and an annular lamp support member for interfacing with a lamp having a concave mirror. The upper and lower rod supports collectively form a rod support, wherein a square cross-sectioned light transmission connecting rod is seated therein via a resilient grommet. Accordingly, because the lamp support member is integral with the upper rod support, when the concave mirror is seated at the lamp support member the lamp is automatically aligned with respect to the light transmission connecting rod.

10 Claims, 5 Drawing Sheets

FIBER OPTIC LIGHT SOURCE MODULE WITH RESILIENT GROMMET SUPPORTING MEANS FOR A LIGHT-TRANSMISSIVE ROD WITH SQUARE CROSS-SECTION

TECHNICAL FIELD

The present invention relates to fiber optic systems, and more particularly to a lighting distribution system which is a hybrid of dual optical fiber media. Still more particularly, the present invention relates to a fiber optic light source module for providing a source of illumination to be distributed by a plurality of optical fiber leads of the hybrid fiber optic lighting distribution system.

BACKGROUND OF THE INVENTION

As motor vehicles become increasingly sophisticated, there is an attendant need for distributed lighting to a variety of locations of the motor vehicle. While discrete conventional light sources, such as incandescent bulbs, may be placed wherever lighting is desired, there are distinct disadvantages to this mode of lighting. For example, each illumination location (illumination feature) requires a separate bulb and bulb fixture, as well as a separate power lead. These requirements of discrete conventional light sources are undesirably complex and costly, and involve excessive maintenance and increased vehicular weight.

It would, therefore, be a major benefit if a fiber optic distributed lighting system could be used in place of a multiplicity of discrete light sources. However, fiber optic distributed lighting has the draw back that a source of light having sufficient brilliance to adequately illuminate a number of illumination features would require high temperature tolerant fiber optic media. Unfortunately, although available, such fiber optic media are prohibitively expensive to use throughout the fiber optic lighting distribution system.

Accordingly, what is needed in the art is a fiber optic lighting distribution system which is high temperature tolerant only where required, is inexpensive and easily maintained. More particularly, what remains needed is provision for a fiber optic light source module for providing illumination to the plurality of fiber optical leads of the fiber optic lighting distribution system.

SUMMARY OF THE INVENTION

The present invention is a fiber optic light source module (FOLSM) of a hybrid fiber optic lighting distribution system, wherein the FOLSM is optically interfaced with an optical jumper that includes a plurality of glass optical fiber (GOF) leads, and wherein the optical jumper is, in turn, optically interfaced with an optical distributor that includes a plurality of plastic optical fiber (POF) leads, wherein the optical jumper and optical distributor serve to distribute light from the FOLSM to various lighting features.

The FOLSM according to the present invention includes a base, a lamp holder connected to a forward portion of the base and an access cover connected to a rearward portion of the base. The base has a lamp cavity, a communicating lower rod support and an electrical lead port. The lamp holder has a front cover for partly covering the lamp cavity to form an optics chamber, an upper rod support and an annular lamp support member for interfacing with a lamp having a concave mirror.

The upper and lower rod supports collectively form a rod support, wherein a square cross-sectioned light transmission connecting rod is seated therein via a resilient grommet so that an inner face thereof communicates with the lamp cavity. Accordingly, because the lamp support member is integral with the upper rod support, when the concave mirror is seated at the lamp support member the lamp is automatically aligned with respect to the light transmission connecting rod.

In operation, the light transmission connecting rod is placed, via the resilient grommet, into the lower rod support eruptively out of position with respect to the lower rod support. A wire spring is secured to the base and the lamp holder as the lamp holder is attached to the base. The lamp is secured to the lamp support member by the wire spring. The rear cover is then installed on the base.

Now, a connector assembly for optically interfacing a plurality of glass optical fiber leads with the FOLSM is attached thereto, wherein a nose of a connector ferrule of the connector assembly abuts the light transmission connecting rod and pushes it retractively with respect to the rod holder into its proper position. A connector housing of the connector assembly locks onto the housing of the FOLSM, particularly the lamp holder thereof.

Accordingly, it is an object of the present invention to provide a fiber optic light source module which provides inherent alignment between a lamp thereof and a light transmission connecting rod thereof. It is an additional object of the present invention to provide a fiber optic light source module for a hybrid light distribution system, wherein a connector assembly thereof optically interfaces therewith.

These, and additional objects, advantages, features and benefits of the present invention will become apparent from the following specification.

DESCRIPTION OF THE PREFERRED EMBODIMENT

Figure 1:
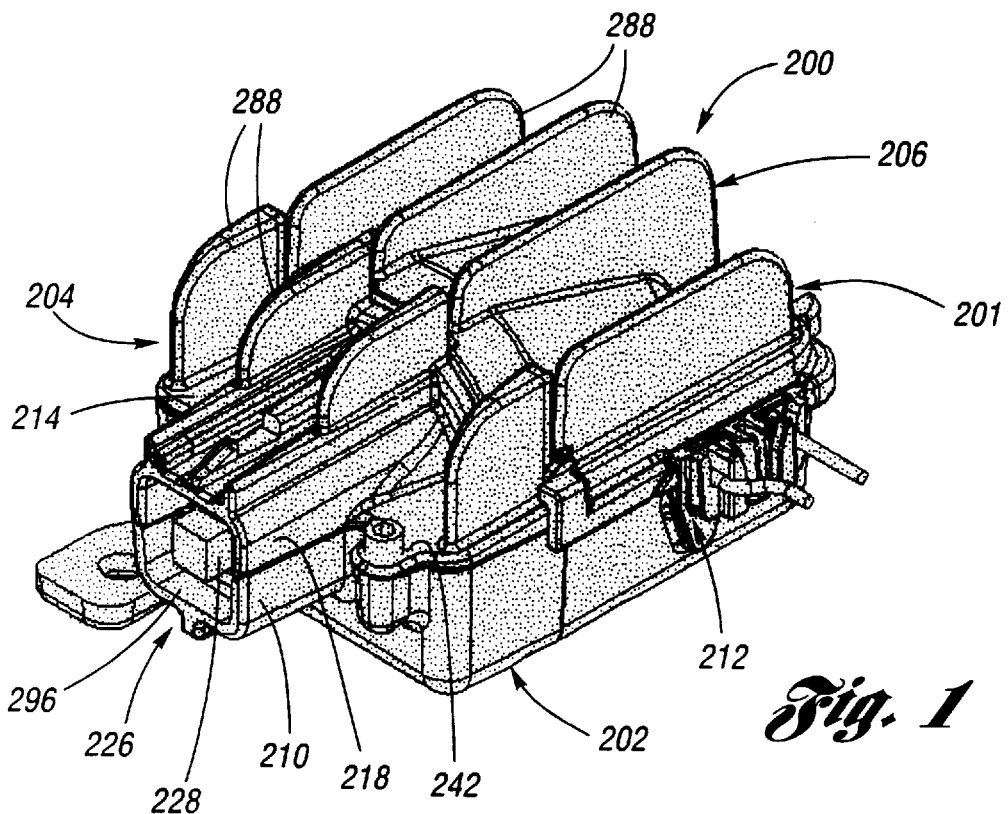
FIG. 1 is a perspective view of the fiber optic light source module according to the present invention.
Figure 2:
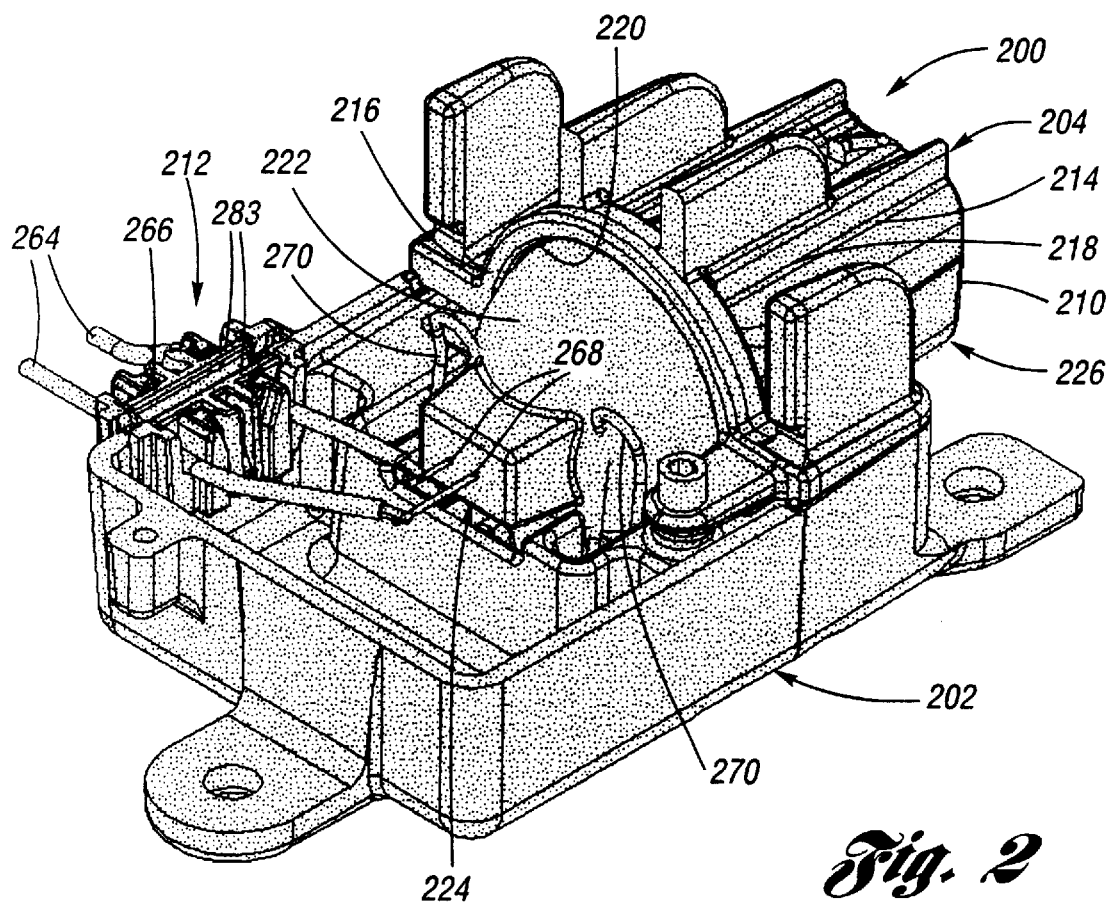
FIG. 2 is a second perspective view of the fiber optic light source module, wherein the access cover has been removed.

Referring now to the Drawing, FIGS. 1 and 2 show the fiber optic light source module (FOLSM) 200 according to the present invention. The FOLSM 200 includes a housing 201 composed of a base 202, a lamp holder 204 removably connected to a forward portion of the base and an access cover 206 removably connected to a rearward portion of the base. The base 202 has a lamp cavity 208 (see FIG. 4), a lower rod support 210 which communicates with the lamp cavity and an electrical lead port 212. The lamp holder 204 has an integral front cover 214 for in part covering the lamp cavity 208, an annular lamp support member 216 and an upper rod support 218. The lamp support member 216 has a stepped rim 220 for capturing the concave mirror 222 of a lamp 224. The upper and lower rod supports 218, 210 collectively form a rod support 226, wherein a square cross-sectioned light transmission connecting rod 228 is seated therein via a resilient grommet 230 (see FIG. 6). An optics chamber 221 is formed by a portion of the lamp cavity 208 and the lamp holder 204, whereat the lamp 224 transmits light to the light transmission connecting rod 228 (see FIG. 10).

The details of the FOLSM 200 will now be further elaborated with additional reference to FIGS. 3 through 10.

Figure 3:
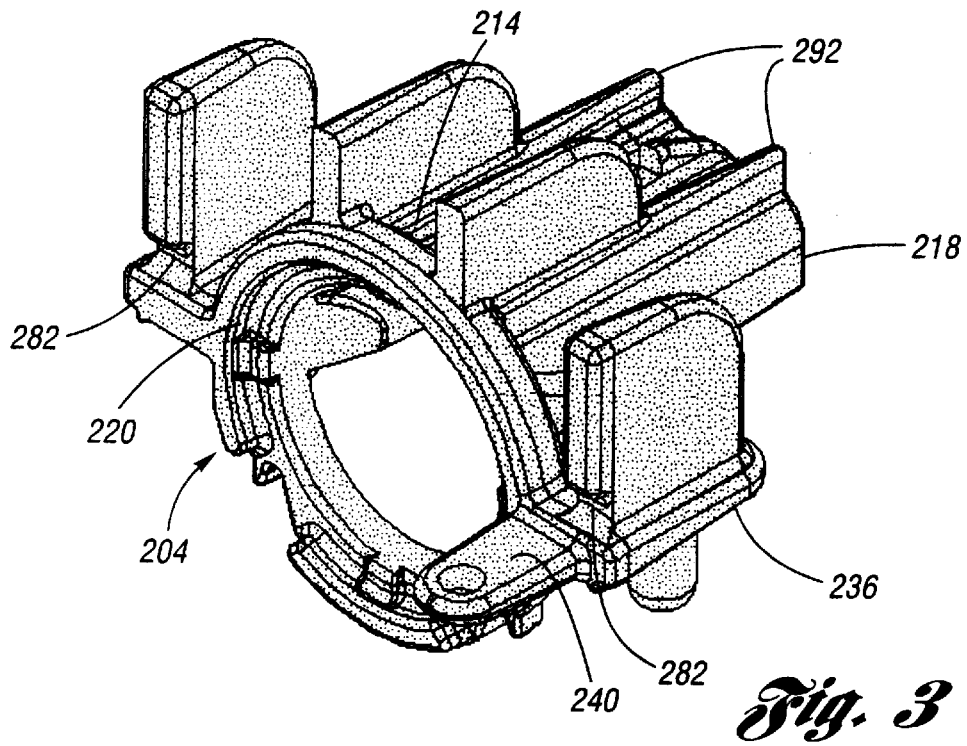
FIG. 3 is a perspective view of the lamp holder of the fiber optic light source module.
Figure 4:
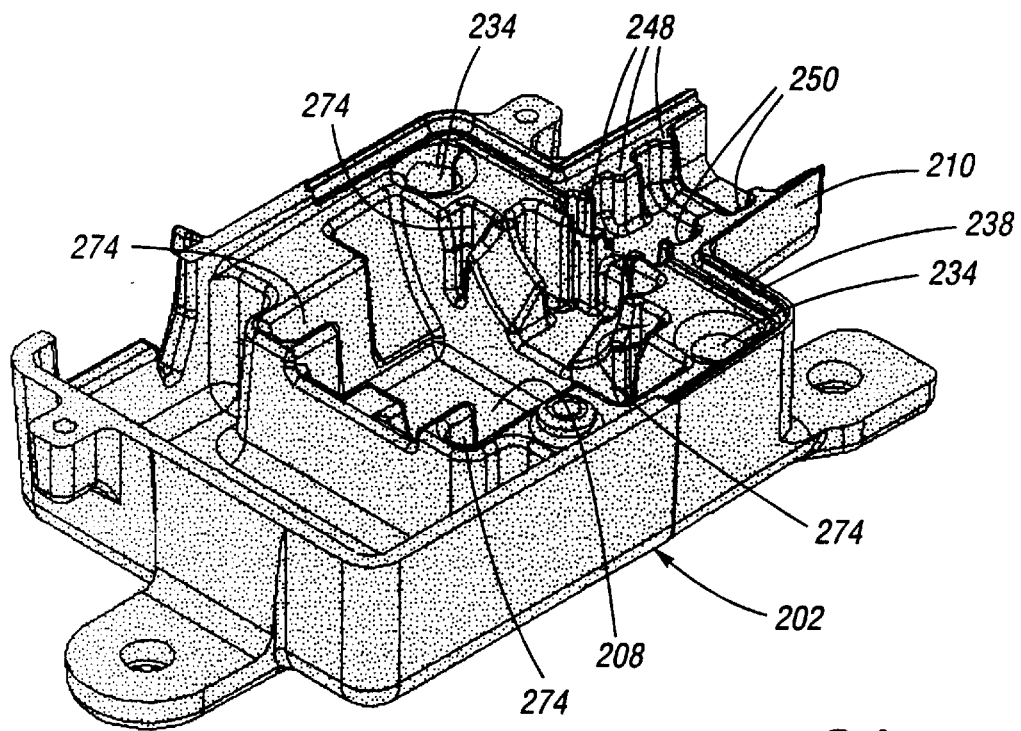
FIG. 4 is a perspective view of a base of the fiber optic light source module.
Figure 5:
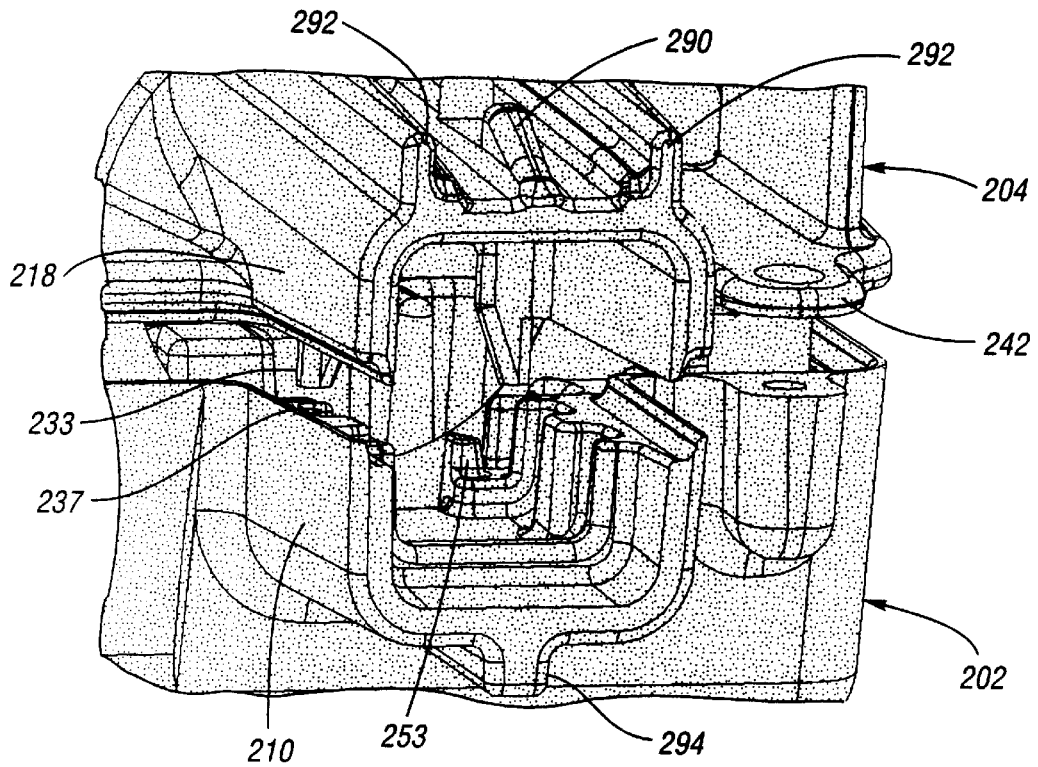
FIG. 5 is an exploded front perspective view of the fiber optic light source module, showing in particular the upper and lower rod supports thereof.
Figure 8:
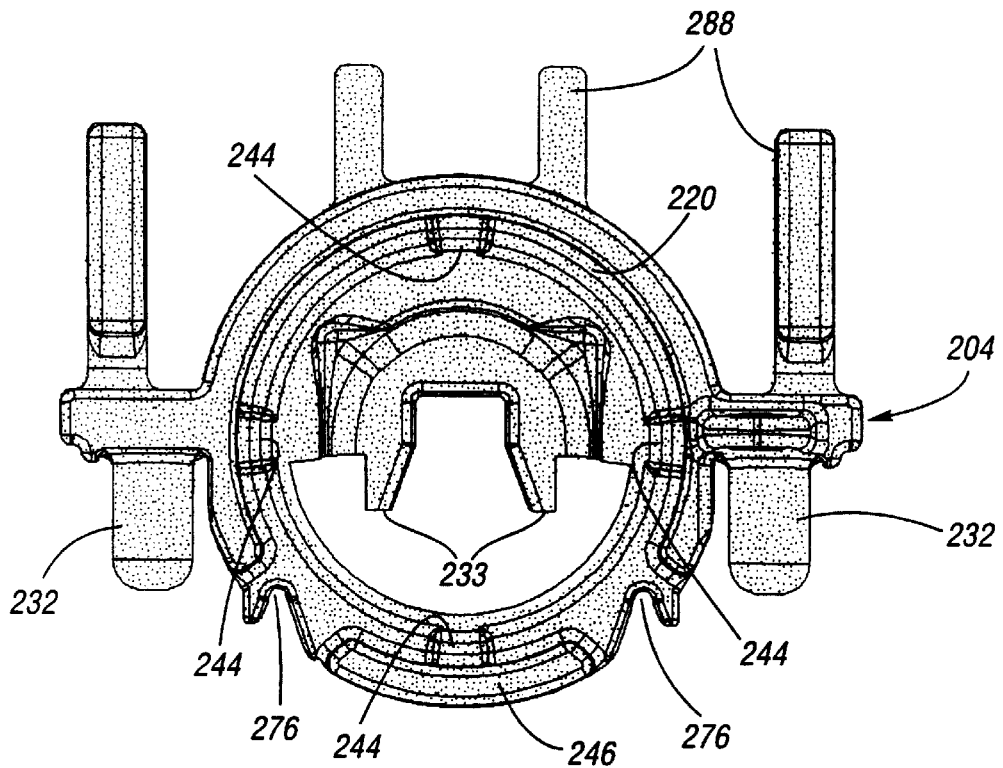
FIG. 8 is a rear end view of the lamp holder of the fiber optic light source module.
Figure 10:
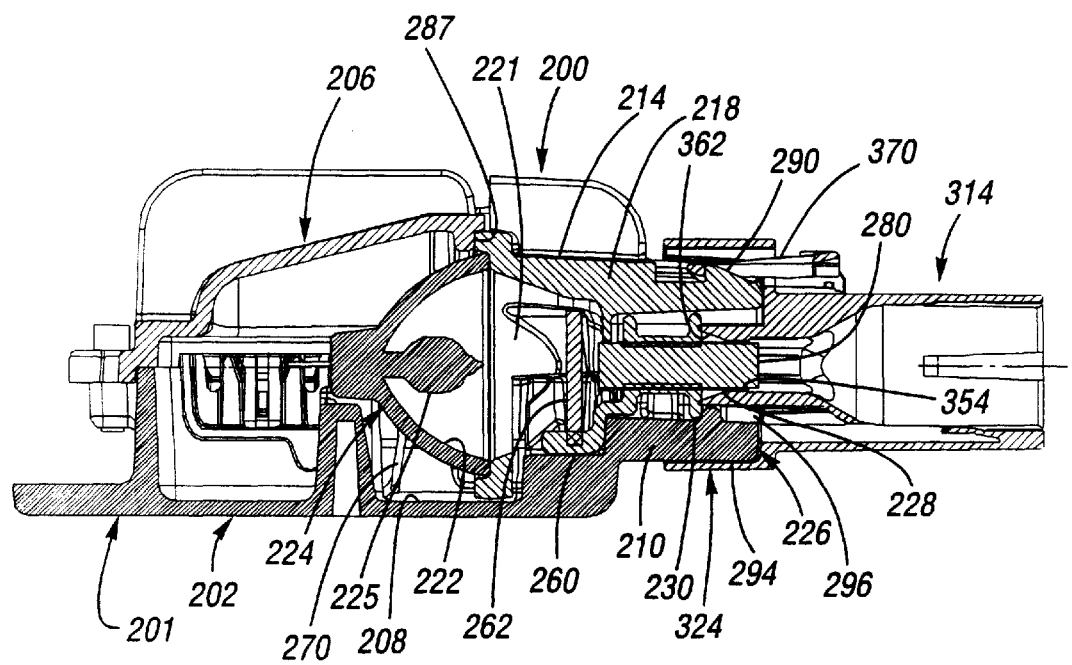
FIG. 10 is a partly sectional side view of the fiber optic light source module and connector housing of FIG. 9.

As shown best at FIGS. 4 and 8, the lamp holder 204 has a pair of posts 232 which are alignably received into post holes 234 of the base 202. The lamp holder 204 has a stepped lower edge 236 which sealingly interfaces to a stepped upper edge 238 of the base 202, shown at FIGS. 3 and 4, wherein the mating surfaces are complementarily stepped. FIGS. 1 and 3, first and second tabs 240, 242 are individually screwed to the base, wherein the first tab is covered by the access cover 206. Referring now to FIGS. 2 and 10, when the lamp holder 204 is connected with the base 202, the lamp support member 216 is in part located within the lamp cavity 208, and the optics chamber 221 is formed.

As seen best by simultaneous reference to FIGS. 2, 3 and 8, the concave mirror 222 interfaces receivably into the stepped rim 220, wherein bosses 244, located equidistantly therearound, engage the concave mirror. A lip 246 aids centering of the concave mirror 222 with respect to the bosses 244.

Figure 6:
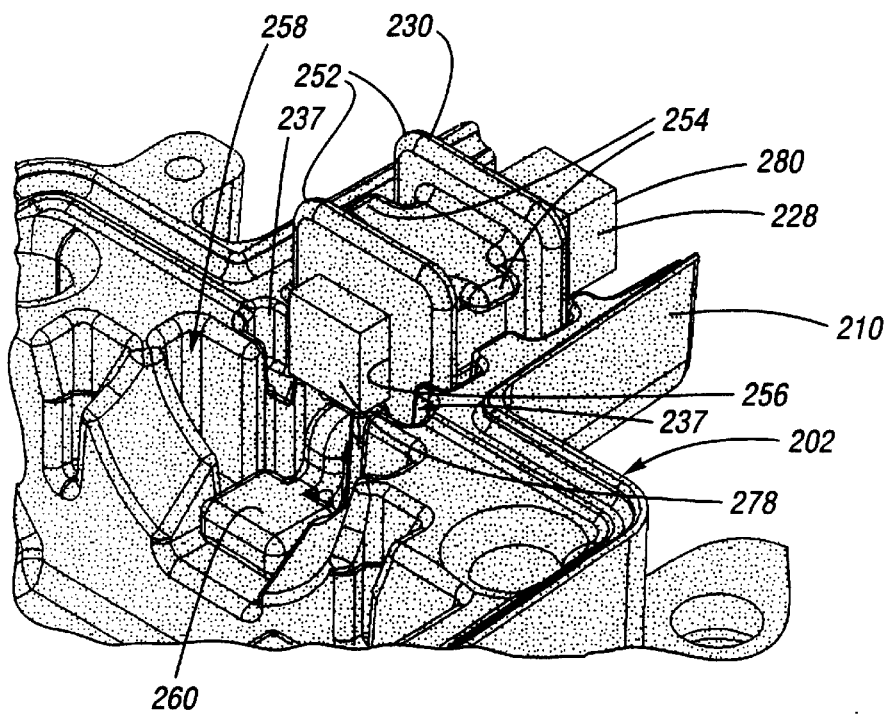
FIG. 6 is a perspective view of the base of the fiber optic light source module, showing the light transmission coupling rod and its resilient grommet interfitted with the lower rod support.
Figure 7:
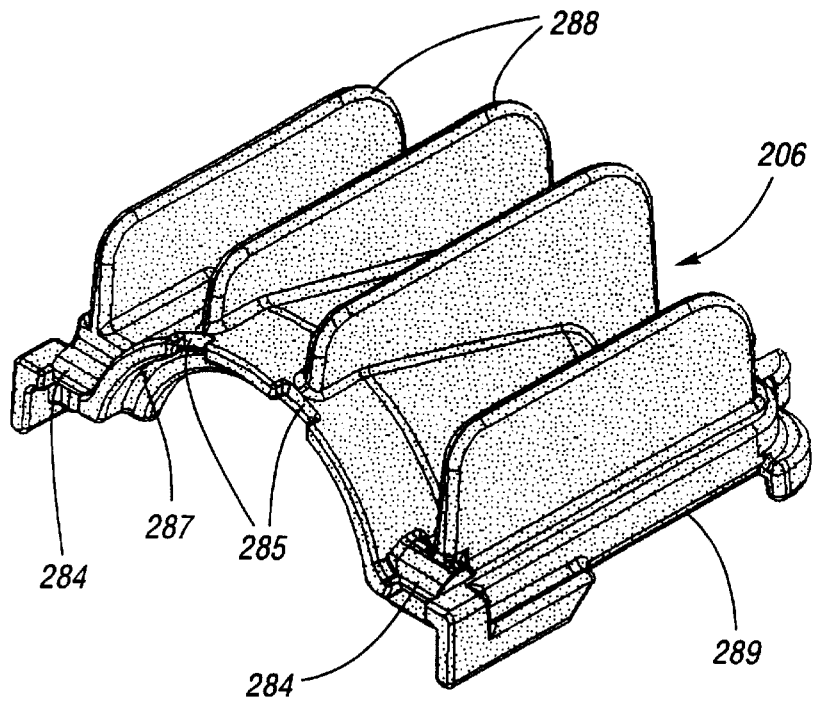
FIG. 7 is a perspective view of the access cover of the fiber optic light source module according to the present invention.

As indicated hereinabove, when the lamp holder 204 is connected to the base 202, the upper and lower rod supports 218, 210 collectively form the rod support 226. The lower rod support 210 has ribs 248 which define grooves 250 for receiving beads 252 of the resilient grommet 230. A tab 254 of the resilient grommet 230 prevents improper installation into the lower rod support 210. The resilient grommet 230 has a square cross-sectioned central bore 256 for snugly receiving therein the square cross-sectioned light transmission connecting rod 228. The light transmission coupling rod 228 is composed of glass and has a shrink wrap teflon cladding 235 (see FIG. 10). In operation, as shown at FIG. 6, the light transmission connecting rod 228 is first received into the central bore 256, then the resilient grommet 230 is placed into the lower rod support 210. When the lamp holder 204 is connected with the base 202, the upper rod support 218 sealingly and aligningly engages the beads 252 of the resilient grommet 230. An opening 296 is formed between the rod support 226 and the light transmission connecting rod 230 extending substantially from the outer face 280 to the light transmission connecting rod 228.

As shown at FIGS. 4 and 6, the lamp cavity 208 adjacent the lower rod holder 210 has an infra-red (IR) filter holder 258, wherein a foot 260 of the resilient grommet 230 forms a resilient lower part thereof. An IR filter 262 is shown in place in the IR filter holder at FIG. 10.

A wire spring 270 engages the base 202 via guides 274 and engages the lamp support member via notches 276 thereof as the lamp holder is installed on the base. Now, the lamp 224 is installed on the lamp holder, whereupon the wire spring presses upon the concave mirror seatably with respect to the lamp support member 216. Electrical leads 264 pass through the electrical lead port 212 which includes a strain relief member 266 for preventing untoward tugs upon the electrical leads from disturbing the lamp 224. The electrical leads 264 are welded to the lamp leads 268 to ensure long term good contact under high heat and vibratory conditions. The lamp 224 preferably utilizes a halogen type bulb 225 (see FIG. 10).

Installation of the lamp holder with respect to the base is guided by the posts 232 and post holes 234. During installation, the upper rod support 218 interfaces with the resilient grommet 230 firstly via flared alignment guides 233, which serve to properly align the transmission connecting rod. The alignment guides 233 enter into alignment guide slots 237 of the lower rod support 210. Posts 253 (see FIG. 5) prevent the light transmission connecting rod from being pushed out of position when the lamp holder 204 is installed.

With comparison between FIGS. 1 and 2, it will be appreciated that because the lamp support member 216 is integral with the upper rod support 218, when the concave mirror 222 is seated at the stepped rim 220 the lamp 224 is automatically aligned with respect to the light transmission connecting rod 228. Accordingly, upon installation of the lamp 224 and the light transmission connecting rod 228, the optics of the optics chamber 221 are complete, and the concave mirror 222 reflects the light from the bulb to an inner face 278 of the light transmission connecting rod, whereupon it is transmitted to the outer face 280 thereof.

The rear of the lamp holder 204 is provided with a pair of notches 282 which capture respective shoes 284 of the access cover 206. Opposite the shoes 284 the access cover is provided with a tab 286 which is screwed to the base. The access cover 206 is removable independently of the lamp holder 204, whereby the bulb can be serviced without disturbance of the optics. The access cover 206 has a stepped lip 287 which sealingly engages the lamp support member 216. The access cover also has a cut-out 289 for sealing with respect to panels 283 of the strain relief 266. The access cover further has notches 285 at the stepped lip 287 for accommodating fins 288 of the lamp holder 204.

As shown at FIG. 1, both the access cover 206 and the front cover 214 of the lamp holder 204 are provided with a plurality of fins 288. In this regard, heat dissipation from the halogen bulb is facilitated by an anodized surface finish of the aluminum of the housing 201.

Figure 9:
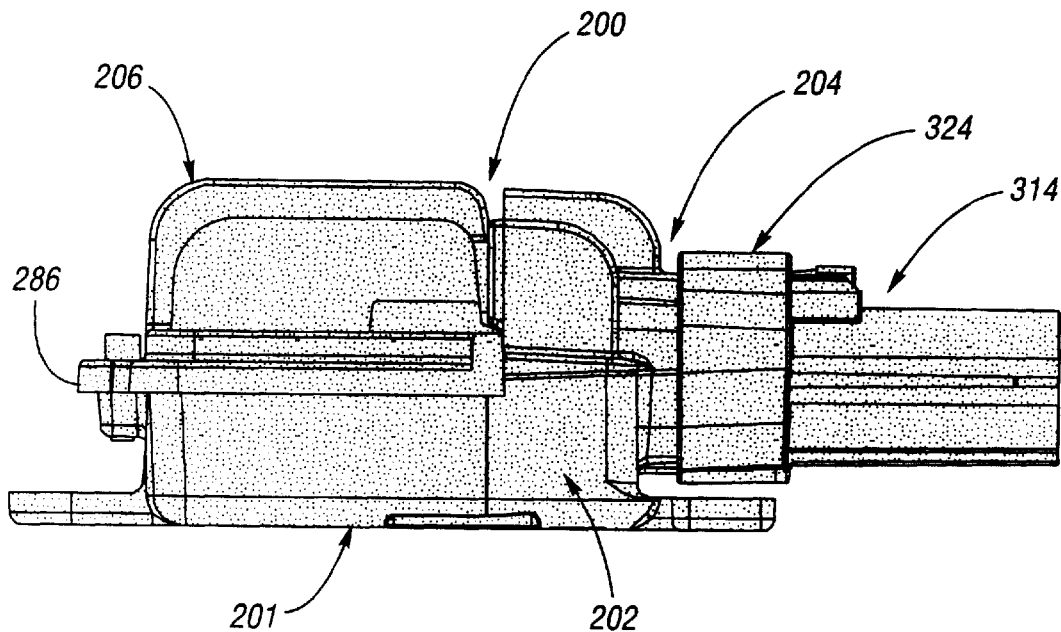
FIG. 9 is a side elevational view of the fiber optic light source module, shown in operation with respect to a connector housing of a connection assembly of a hybrid fiber optic light distribution system.

Operation of the FOLSM 200 with respect to a hybrid fiber optic lighting distribution system can be understood by reference to FIGS. 9 and 10.

A connector assembly of a hybrid fiber optic lighting distribution system includes a connector housing 314 and a connector ferrule received in the connector housing. The connector housing 314 has a connection member 324 for interconnecting with the FOLSM housing 201 at the forward end of the base 202 and the lamp holder 204. A ramped ear 290 on the lamp holder 204 engages a lock arm 370 of the connection member 324. The connection member 324 of the connector housing 314 has predetermined alignment surfaces for engaging the housing 201, including guide rails 292 of the lamp holder 204. No-draft interface surfaces of the connection member 324 mate with the housing 201 of the FOLSM 200. A slot of the connection member 324 accepts a raised rib 294 of the FOLSM for purposes of enhanced interconnection stability between the deeply drafted die cast aluminum of the FOLSM and the molded plastic of the connector housing 314. A flared forward opening 362 of a rod seat 354 for receiving the light transmission connecting rod 228 abuts the resilient grommet 230, thereby providing a primary seal between the connector housing 314 and the housing 201 of the FOLSM 200.

The light transmission connecting rod 228 is intentionally out of position with respect to the housing 201 so as to extend eruptably a preselected extra amount outwardly from the rod support 226. The connection member 324 is brought into engagement with the FOLSM, wherein the light transmission connecting rod 228 inserts into the rod seat 354. As the FOLSM housing 201 engages the connector housing 314, the flared forward opening 362 enters into the opening 296 of the rod support 226, centers the light transmission connecting rod with respect to the rod seat 354 and firmly and sealingly abuts the resilient grommet 230. During engagement of the FOLSM housing 201 to the connector housing 314, glass optical fiber (GOF) leads (not shown) bundled by the connector assembly push upon the outer rod face 280 of the light transmission connecting rod so as to flex the resilient grommet 230 and thereby move the light transmission connecting rod from its out of position location. Now, the outer rod face 280 is aligned with, and proximate to, the GOF upstream face (not shown) of the GOF leads, whereupon light from the FOLSM supplies light to the GOF leads.

To those skilled in the art to which this invention appertains, the above described preferred embodiments may be subject to change or modification. Such change or modification can be carried out without departing from the scope of the invention, which is intended to be limited only by the scope of the appended claims.

We claim:

1. A fiber optic light source module for a fiber optic lighting distribution system, comprising:

a base having a lower rod support;

a lamp holder having an annular lamp support, said lamp holder further having an upper rod support matably engageable with said lower rod support to thereby collectively form a rod support;

a light transmission connecting rod, said light transmission connecting rod having an inner face and an opposite outer face;

a resilient grommet having a central bore for snugly receiving therein said light transmission connecting rod, said resilient grommet being partly received into each of said upper and lower rod supports to thereby support said light transmission connecting rod in said rod support; and illumination means for providing illumination to said inner face of said light transmission connecting rod, said illumination means comprising lamp means for providing a source of illumination and mirror means for directing light from said lamp means, said mirror means being seated with respect to said annular lamp support such that said lamp means is optically aligned with said inner face of said light transmission connecting rod.

2. The fiber optic light source module of claim 1, wherein said base further comprises a lamp cavity into which said lamp holder is in part located, said lamp holder collectively forming with said base an optics chamber, said optics chamber communicating with said illumination means and said inner face.

3. The fiber optic light source module of claim 1, wherein said light transmission connecting rod has a square cross-section; and wherein said central bore has a square cross-section corresponding to said square cross-section of said light transmission connecting rod.

4. The fiber optic light source module of claim 1, further comprising bead and groove interlock means for seating said resilient grommet within said lower rod support.

5. The fiber optic light source module of claim 1, wherein an opening is formed concentrically between said light transmission connecting rod and said rod support, said opening extending substantially from said outer face to said resilient grommet.

6. The fiber optic light source module of claim 1, further comprising an access cover connected to said base independently of said lamp holder for providing servicing access to said lamp means, wherein said access cover is removable from said base while said rod support remains at a fixed position relative to said base.

7. The fiber optic light source module of claim 3, wherein said base further comprises a lamp cavity into which said lamp holder is in part located, said lamp holder collectively forming with said base an optics chamber, said optics chamber communicating with said illumination means and said inner face.

8. The fiber optic light source module of claim 3, further comprising bead and groove interlock means for seating said resilient grommet within said lower rod support.

9. The fiber optic light source module of claim 3, wherein an opening is formed concentrically between said light transmission connecting rod and said rod support, said opening extending substantially from said outer face to said resilient grommet.

10. The fiber optic light source module of claim 3, further comprising an access cover connected to said base independently of said lamp holder for providing servicing access to said lamp means, wherein said access cover is removable from said base while said rod support remains at a fixed position relative to said base.

* * * * *